United States Patent [19]
Yogev

[11] Patent Number: 5,685,289
[45] Date of Patent: Nov. 11, 1997

[54] HEAT STORAGE DEVICE

[75] Inventor: Amnon Yogev, Rehovot, Israel

[73] Assignee: Yeda Research And Development Co., Ltd., Rehovot, Israel

[21] Appl. No.: 317,815

[22] Filed: Oct. 4, 1994

[51] Int. Cl.$^6$ ............................................. F28D 21/00
[52] U.S. Cl. .................... 126/400; 126/600; 126/618; 126/635; 126/688; 165/104.11
[58] Field of Search ........................ 126/600, 617, 126/618, 635, 684, 688, 696; 165/104.11

[56] References Cited

U.S. PATENT DOCUMENTS

| | | | |
|---|---|---|---|
| 4,068,474 | 1/1978 | Dimitroff . | |
| 4,249,592 | 2/1981 | Greene | 126/400 |
| 4,335,578 | 6/1982 | Osborn et al. | 126/535 X |
| 4,397,152 | 8/1983 | Smith | 126/635 X |
| 4,454,865 | 6/1984 | Tammen | 126/679 X |
| 4,466,478 | 8/1984 | Carlson et al. | 165/104.17 X |
| 4,513,733 | 4/1985 | Braun . | |
| 4,662,354 | 5/1987 | Stoy et al. | 126/635 X |
| 4,696,338 | 9/1987 | Jensen et al. | 165/104.11 X |

Primary Examiner—Carl D. Price
Attorney, Agent, or Firm—Keck, Mahin & Cate

[57] ABSTRACT

A two layer system for heat energy capture and storage with an upper or lower layer for heat extracting and the other layer for heat transfer. Either layer can function as a phase change material. Heat stored is conducted externally of the system and can be used directly in a converting system, i.e., heat to mechanical or electrical energy or transferred as heat for further applications.

54 Claims, 10 Drawing Sheets

HEAT STORAGE DEVICE

FIELD OF INVENTION

The present invention relates to an improved heat storage device, particularly for use in a solar energy system.

BACKGROUND OF INVENTION

Energy storage in the form of heat is very important in the management of many energy systems, but it is of major importance to solar energy systems. The most mature systems are those that are based on sensible heat or phase change systems. The advantage of phase change systems over sensible heat systems is their higher heat capacity. For example most storage materials based on sensible heat can provide less than one calorie per degree centigrade while phase change from solid to liquid can provide 160 calories per gram without any change of temperature. However, these systems are more difficult to use since the solid material tends to precipitate on the heat exchanger thus preventing efficient heat transfer.

Many solar receivers are tubular receivers and precipitation of solid material inside the tubes can be fatal to the system.

SUMMARY OF INVENTION

It is the object of this invention to provide an improved method for heat storage based on two layers of different materials, one that is used for storage and the other for heat extraction from the heat storage layer. As an example, the heat storage phase of the system is a phase change material and it cooperates with another phase which is a molten metal much above the melting point and with a density (specific gravity) higher than that of the storage phase. After the heat is stored in the heat storage phase it can be extracted by the liquid metal through direct contact heat exchange with the storage layer and then transferred to another medium for application in several different ways:

i. The liquid (molten) metal can be circulated to another environment where it can release the heat.

ii. The heat can be transferred to tubes immersed in the liquid metal. The tubes can contain a liquid that circulates inside the tubes and removes the heat from the walls of the tubes.

iii. The heat transfer takes place through the walls of tubes immersed in the liquid metal but inside the tubes there is a material with high vapor pressure and the boiling liquid inside the tubes is converted from liquid to vapor removing a large quantity of heat that is usually associated with phase change from liquid to vapor. Such a system is practically a "heat pipe". The vapor can than transfer the heat to another medium after condensing in the environment where the final heat transfer takes place. The condensed liquid is than returned to the source (preferably by gravitation) for re-cycling.

iv. If the liquid metal is selected from metals with a high vapor pressure, then the heat pipe can be formed by immersing a bell shaped collector in the liquid metal and the vapor of the metal is collected in tubes that are integrated in the upper part of the "bell". Alternatively, since the liquid metal with high vapor pressure has to be confined in a closed vessel, the vapor can be collected in the free space above the liquid phase in that closed vessel.

The advantage of this last mentioned system is in the large contact area between the two phases that provides a very efficient heat transfer, and the very large heat conductivity of the liquid metal. This last inventioned system is the most efficient one since it includes a very efficient step of heat transfer from liquid to vapor over a large area.

Within each of the two phases of the above systems the heat is distributed efficiently by convection utilizing the large volume of each phase. A slight slope at the bottom of the vessel containing the lower phase can enhance the free convection inside that phase in the interface between the layers where the transfer of heat from the storage layer to the conducting layer takes place.

If the storage phase is a phase change system, then crystals will precipitate on the interface between the layers. If the storage phase is a material where the solid has a lower density than the liquid, then it is preferred to choose the liquid metal from a material with a higher density than the storage phase. The liquid metal will stay below the storage phase and the solid that is formed on the interface will float to the top of the system without interfering with the heat transfer.

If the storage phase is selected from a material where the solid phase has a higher density than the liquid phase, then the liquid metal should be a metal with a density lower than the storage phase, so that the metal will float on the storage phase and the heat exchange from the liquid metal to an external system can be carried out efficaciously. The crystals that are formed by crystallization of the heat storage material will precipitate on the bottom of the vessel without interfering with the heat exchange.

If the storage system is part of a solar system, then the preferred structure is such that the solar receiver is the storage system and the sun is illuminating directly the upper surface of the storage phase. It is preferred to select that phase from a material relatively transparent to the solar light so that the light can penetrate into the bulk and very efficient convective heat transfer can take place.

If the material is not transparent then the metal layer can be a candidate to facilitate the absorption of the light. The use of the metallic layer for absorption of solar light is limited to metals with low reflectivity and preferably the metallic layer is used in the lower layer. In order to obtain an illumination of the upper layer in a large central receiver system (heliostat field based on a plurality of sun-tracking mirrors that reflect the solar light to a tower) then, a reflective tower system can be used where a mirror placed on the tower reflects the light downwards. A convex mirror can be placed below the focal point (or the aiming point) of the heliostat, and a concave mirror above that point.

In a dish system, a secondary mirror is placed near the focal point preferably to reflect the light to the main axis of the tracking system, thus, keeping a receiver at a fixed point and the collecting system will be placed at that point. In this way the heavy collecting system is stationary while the main mirror is tracking. Alternatively, the secondary mirror is not kept stationary, but is computer controlled to reflect the light to a pre-selected station where the collecting system is stationed.

The novel solar systems according to the invention include various solar driven thermal machines that convert heat energy to mechanical energy. These could be gas turbines (brayton cycles), steam turbines, sterling machines and any other heat engine. Usually gas turbines and steam turbines are specific to large systems while dish systems are often used for small sterling engines. It is important to note that the vapor of the heat pipe can be used as part of the thermal machine, e.g., in the case of sterling engines where Sodium vapor can be used as an internal component in the machine and in such an arrangement Sodium is selected as the liquid metal in the heat storage and transfer system.

The system of the invention can be used also for transferring solar energy to solar chemical reactors like solar reformers or solar gasification systems or to store solar energy for process heat.

Molten salts can be used as the heat storage materials both for sensible heat storage and phase change material. According to this invention, it is particularly advantageous to select pairs of metals and salts of the same metal as the binary system. This selection or combination minimizes the possibilities for chemical reactions between the layers. Alkali metals have low melting points and relatively high vapor pressure and low specific gravity, thus, they are especially useful for applications in these systems. Many fluorides have high value of heat of fusion, are relatively very stable at high temperature and can be used in the inventive heat storage and transfer system. Magnesium can be used in conjugation with its salts, Magnesium has a high vapor pressure, low density, and is generally more safe for use than alkali metals. Aluminium has a low melting point, but a very high boiling point and can be used when safety is important and a heat pipe application is not needed. Zinc is a relatively heavy metal and can be used as a lower metallic layer. The relatively high vapor pressure of Zinc enables its use for heat pipe applications. Lead and Tin can be used in the invention and are examples of heavy liquid metals with low vapor pressure.

Alkali metal salts like Sodium chloride or fluoride, Potassium chloride, Calcium chlorides and Magnesium chlorides are examples of salts that can be used in the invention. Their molten form can be used in various applications of the invention including heat storage. Eutectic mixtures or mixed salts are also useful in the invention. These examples of specific materials show that there is a large selection of salts and metals that can be used for various conditions and applications of the present invention.

When a heavy metal is used in the system, then large hydraulic pressure is formed in the lower part of the system. This pressure can compensate for the internal pressure in a tubular heat exchanger associated with high pressure systems like gas turbines. This effect is very important since the mechanical strength of many materials is degraded at high temperature. Bubbling the working gas through the heavy liquid layer is another important possibility in the present invention since the direct contact heat exchange of the two phases is by far more efficient than heat exchange through walls of tubes or other vessels.

In the invention, heat transfer by free convection inside each of the phases of the system is the preferred manner of carrying out the invention. However, in some cases, like the case where the heating is performed in the upper part of one of the layers, or when heat extraction is done from the lower layer, forced convection can be used as an alternative, or as a supplement to achieve the desired heat transfer. Forced convection can be achieved by mechanical systems like circulation pumps, or mixers, or by bubbling of an inert gas through one of the liquid layers or each of them separately.

Other objects and advantages of the present invention will become apparent from the following detailed description of preferred embodiments when taken in conjunction with the drawings.

DESCRIPTION OF FIGURES OF DRAWING

FIGS. 1a to d show a two layer system where the upper layer is the heat extracting layer and the lower layer is the heat storage with FIG. 1a showing the layers one on top of the other in the molten form, FIG. 1b showing the circulation of the heat extracting layer used for transferring the heat, FIG. 1c showing tubes immersed in the heat extracting phase that contain a fluid that circulates within the tubes to transfer heat to an external system.

FIGS. 3a to d show solar systems with

FIG. 5 shows a solar dish with the storage system placed in the axis of rotation so that light collected by the dish is reflected by a secondary mirror to the storage system.

DETAILED DESCRIPTION OF PREFERRED EMBODIMENTS

Figure 1A:
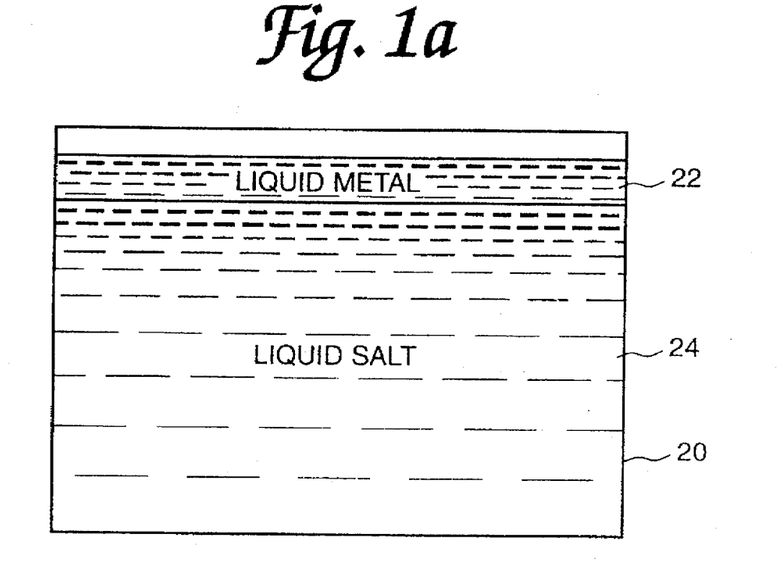
Figure 1B:
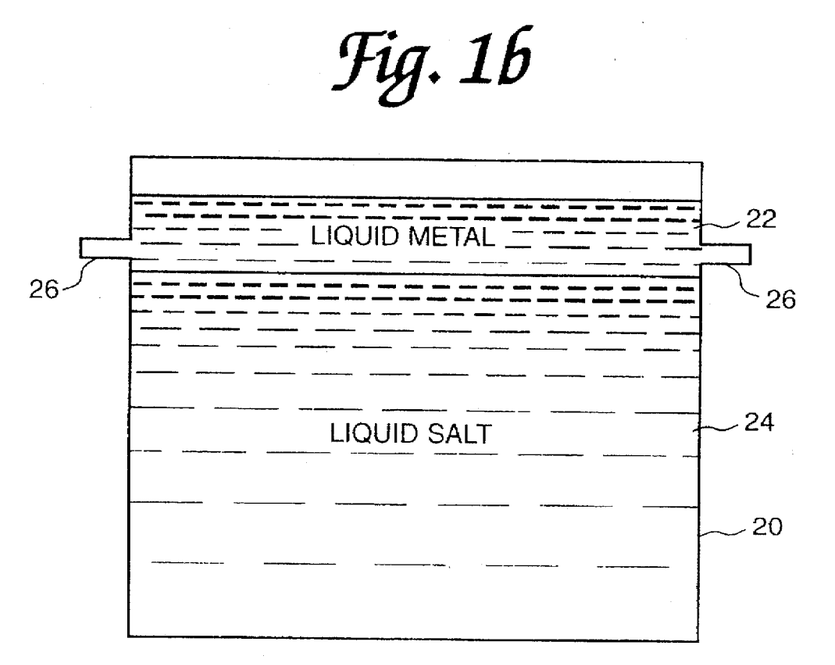
Figure 1C:
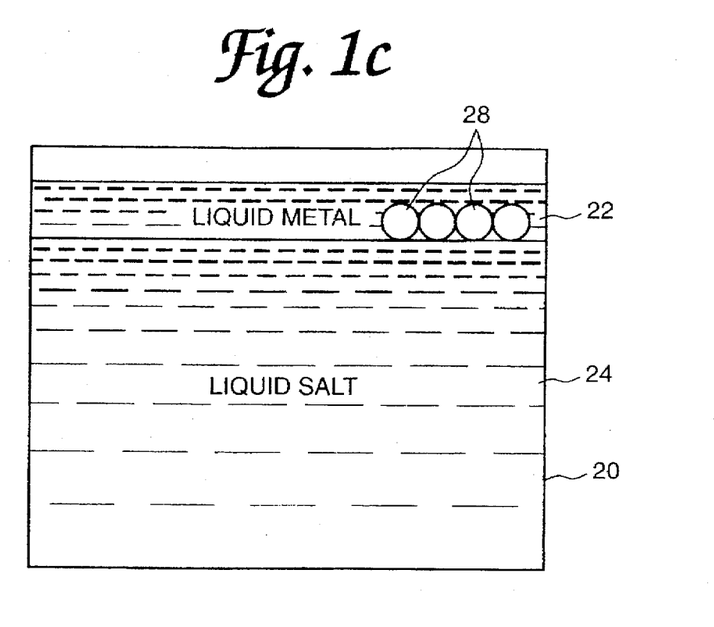
Figure 1D:
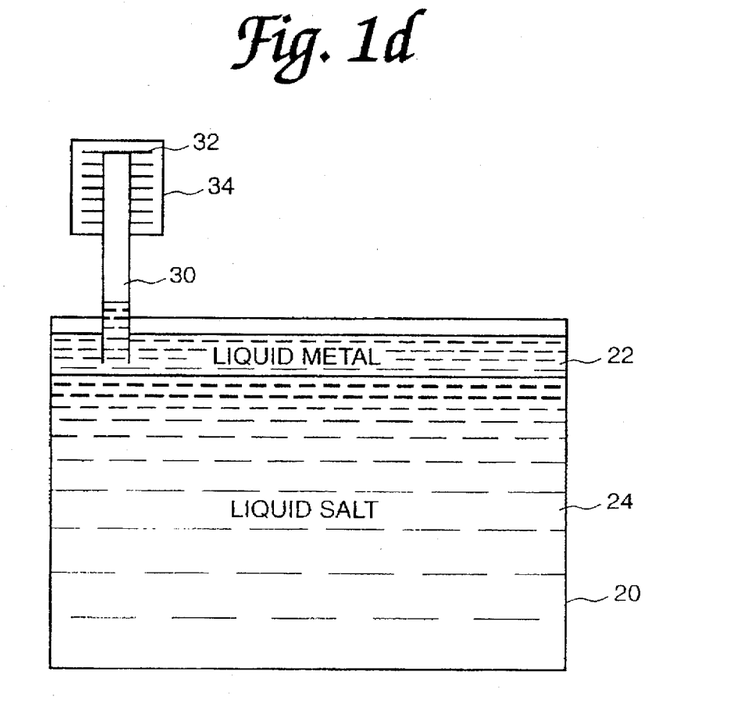
FIG. 1d shows an external heat pipe immersed in the upper layer used for heat transfer.

Referring now to the drawings in detail, FIG. 1a shows a two layer system contained in a vessel 20. The top layer 22 is liquid metal (heating extracting) and the bottom layer 24 is liquid salt (heat collecting). The materials are selected from those referred to and described in detail above. Heat exchange occurs at the interface between the two layers. FIG. 1b shows pipes 26 opening into layer 22 and leading outside vessel 20 for withdrawing liquid metal to utilization or heat transfer point and returning liquid metal the vessel 20. FIG. 1c shows pipes 28 immersed in top layer 22. A suitable fluid flows through pipes 28 to extract heat from liquid metal top layer 22. Pipes 28 extend outside vessel 20 and provide a circulation system that could be closed or opened as required. FIG. 1d shows an external pipe 30 immersed in top layer 22. Liquid metal of top layer 22 can flow into pipe 30. Top of pipe 30 is fitted with fins 32 and the top with fins are contained in a vessel 34 through which a fluid can flow to extract heat via fins 32.

Figure 1E:
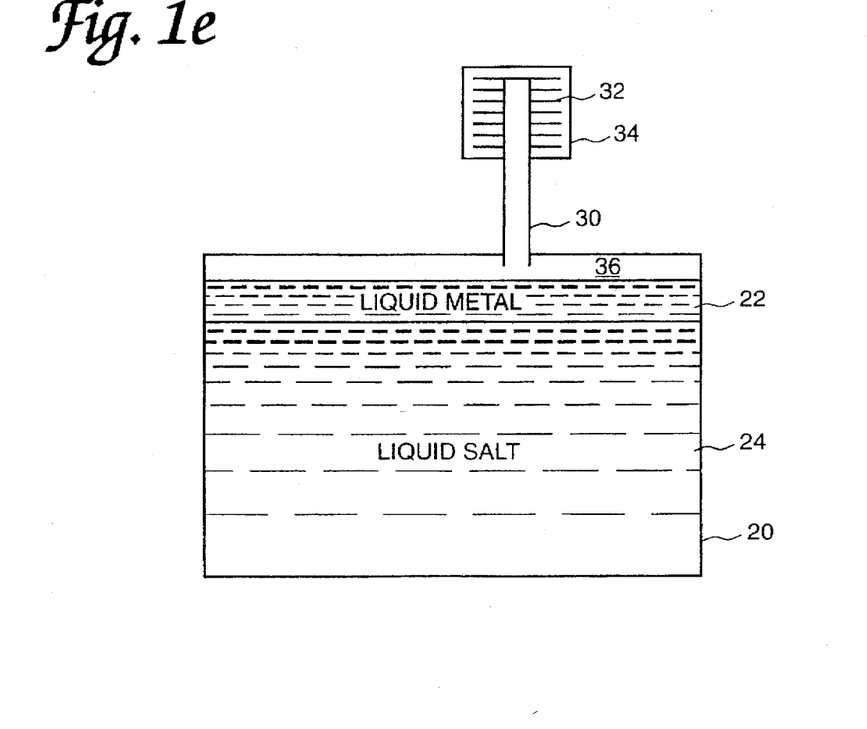
FIGS. 1e and 1f show two configurations of heat pipes based on the volatility of the heat extracting phase.

In FIG. 1e, the pipe 30 is not immersed in top layer 22, but rather is spaced above it, opening into the vapor space 36 above layer 22. In this embodiment, liquid metal top layer 22 is sufficiently volatile so that hot vapors enter pipe 30 and transfer heat to the fluid flowing in vessel 34 via fins 32.

Figure 1F:
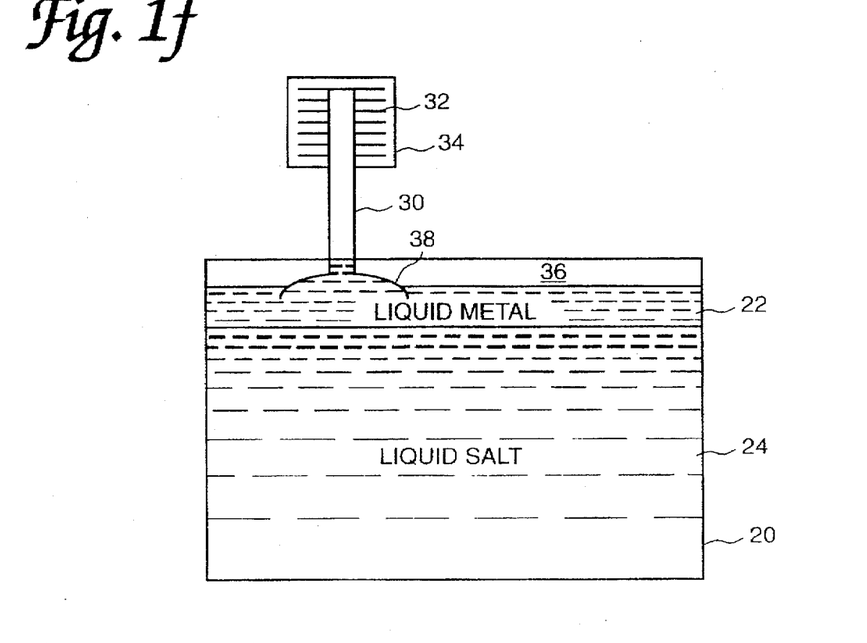
Figure 1G:
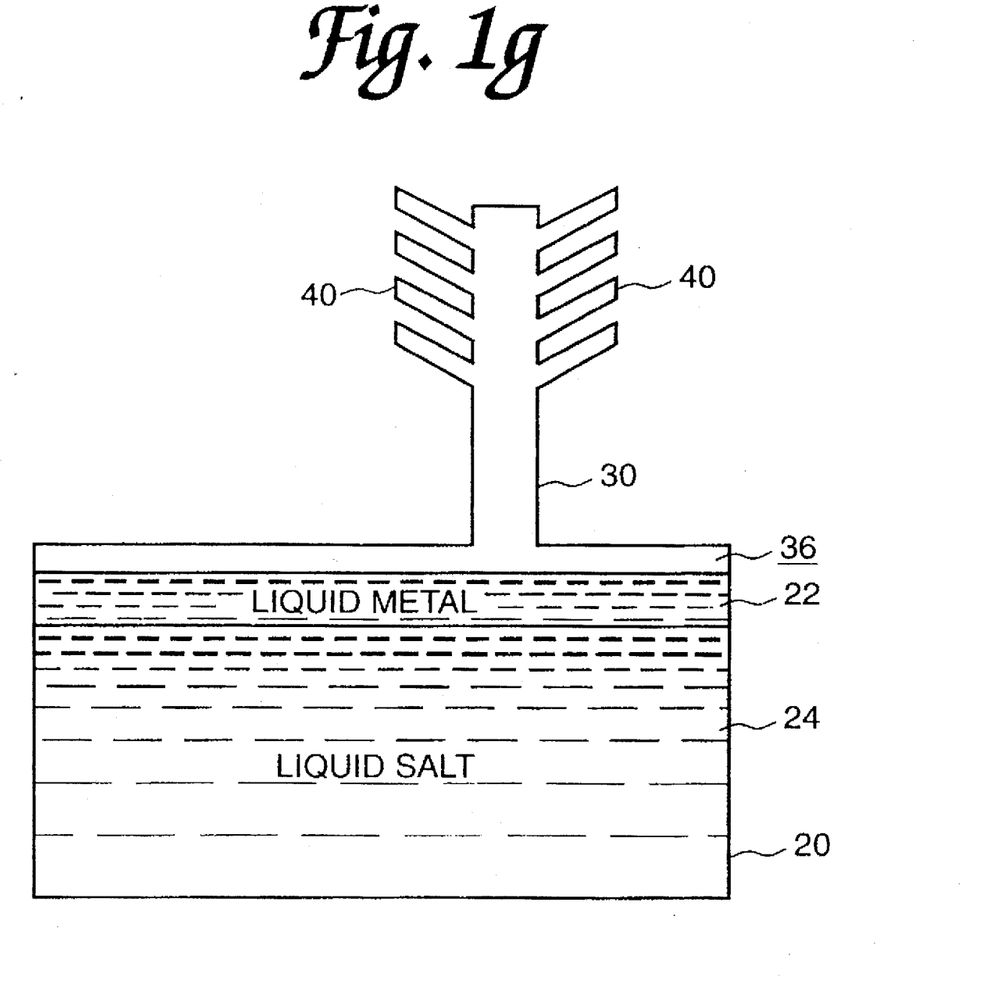
FIG. 1g shows the heat pipe equipped with miniature tubes inside the receiving systems to facilitate the heat transfer instead of metallic fins as shown in FIG. 1d, 12 and 1f.

In FIG. 1f, pipe 30 is fitted with a larger mouth bell 38 to facilitate collection of liquid metal or vapor from upper layer 22. In FIG. 1g, the top end of tube 30 is equipped with miniature tubes 40 that open into tube 30 to enhance transfer of heat from vapor or liquid.

Figure 2A:
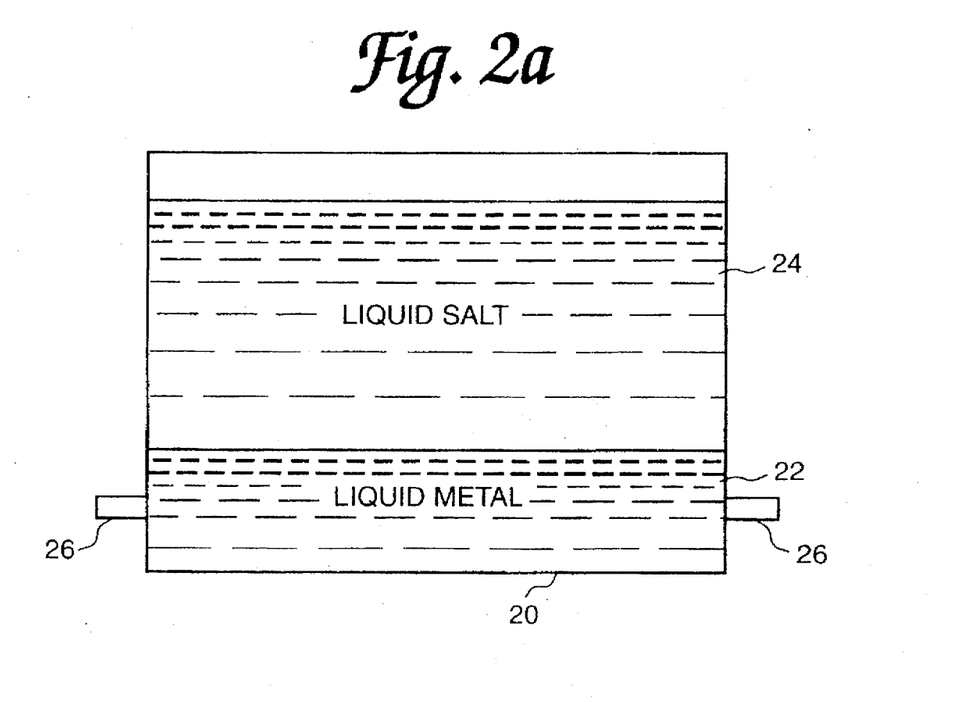
FIGS. 2a, b, c, d and e show similar systems where the metallic layer is the lower layer.
Figure 2B:
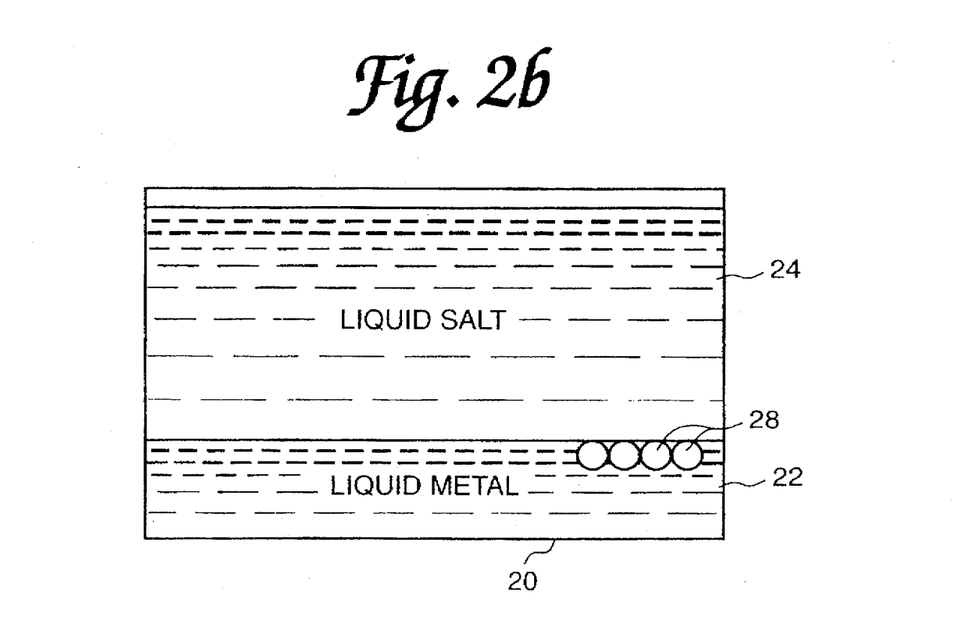
Figure 2C:
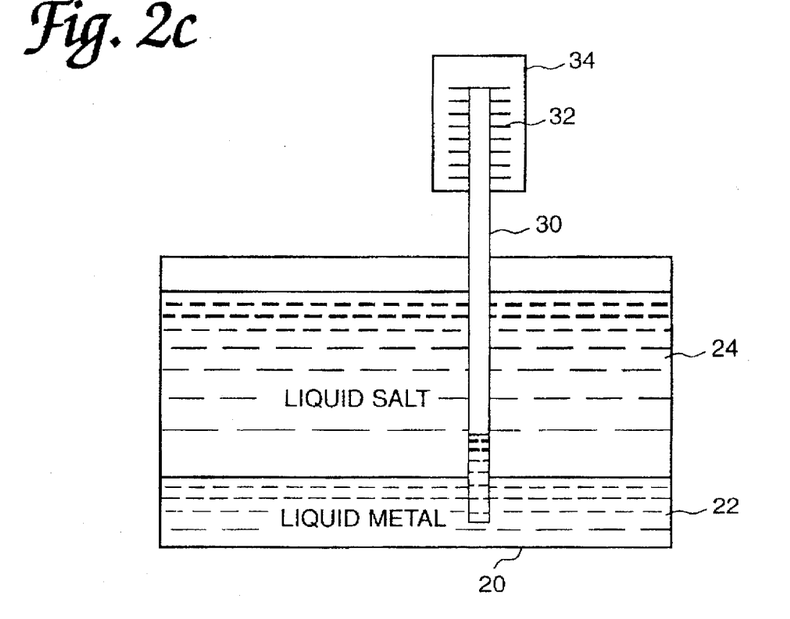
Figure 2D:
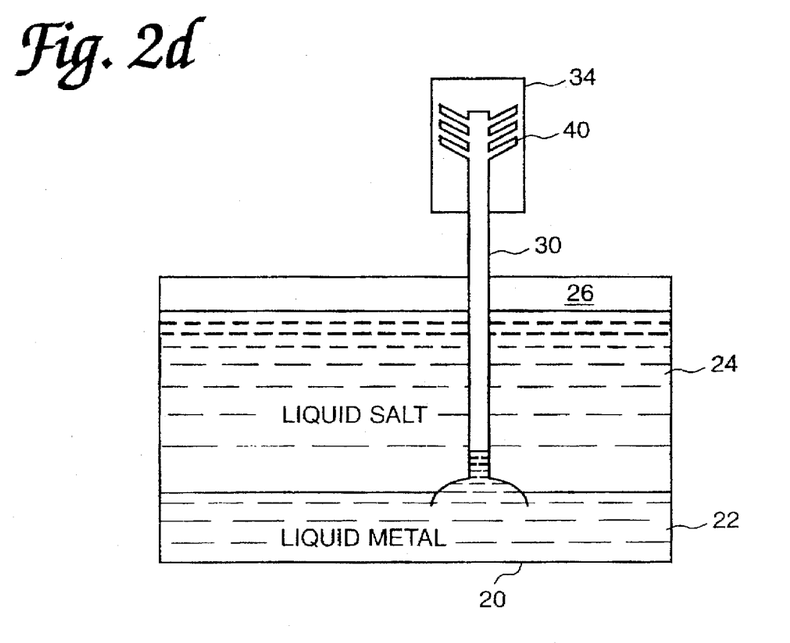
Figure 2E:
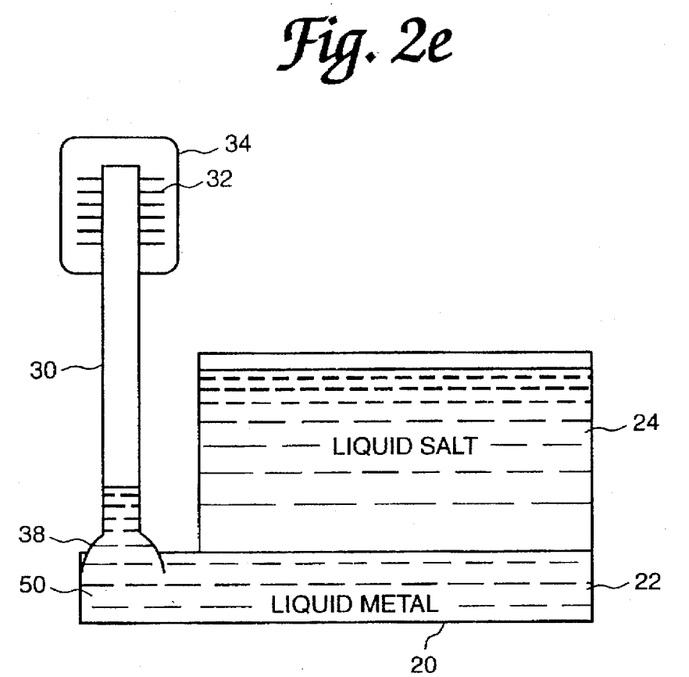
Figure 2F:
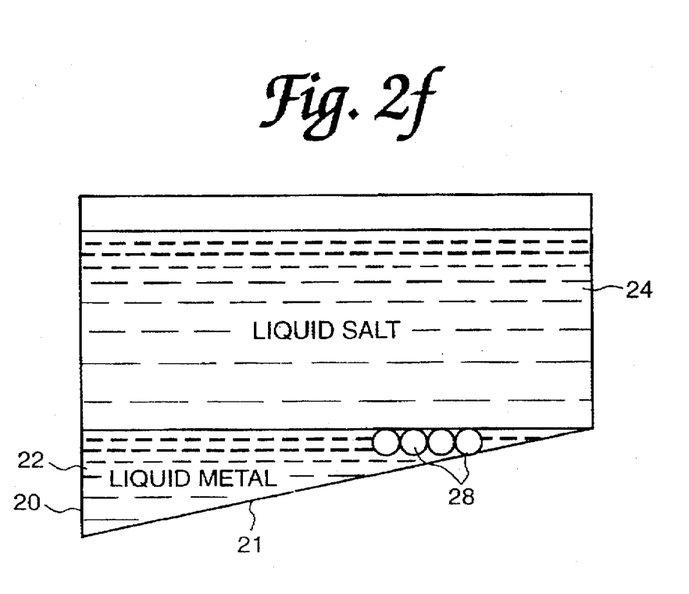
FIG. 2f shows a system wherein the vessel is provided with a slope in the bottom to enhance the free convection of the lower level.

FIGS. 2a–e show systems where the liquid metal layer is below the liquid salt layer. Like parts have been designated by like reference numerals. Note in FIGS. 2c and d, pipe 30 must now extend through the liquid salt layer 24 to be immersed in the liquid metal layer 22. In FIG. 2e, the liquid metal layer 22 extends laterally beyond the liquid salt layer to provide a lateral extension 50 accessible from outside. In this case, pipe 30 with a bell mouth 38 at its lower end is immersed in layer 22 at lateral extension 50. In FIG. 2f, the vessel 20 is provided with a sloping bottom 21 to enhance convection in the lower layer 22.

Figure 3A:
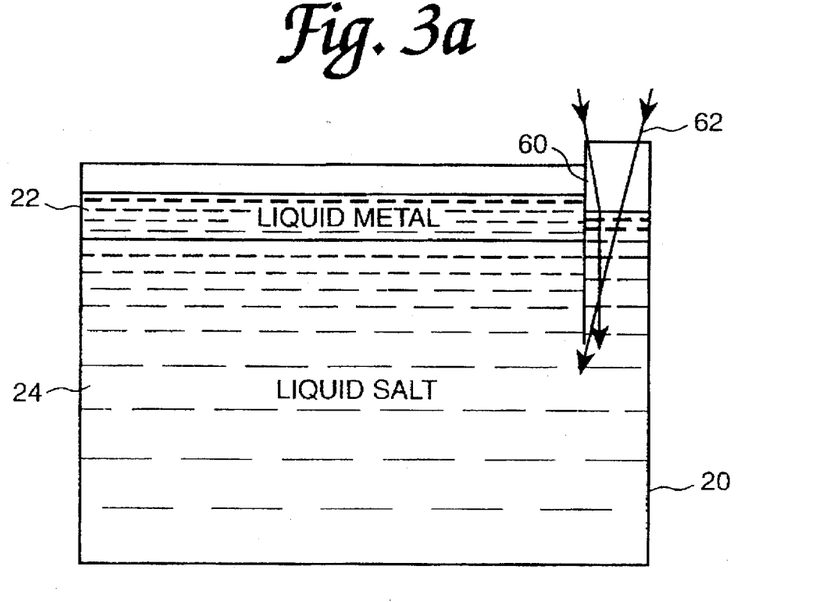
FIG. 3a showing a transparent heat storage system and an upper liquid metal layer, FIG. 3b showing an upper liquid metal layer and the metallic layer used to absorb the solar light, FIG. 3c showing the metallic layer as the bottom layer and absorption of light in the upper layer, and FIG. 3d showing the lower metallic layer used to absorb the light.
Figure 3B:
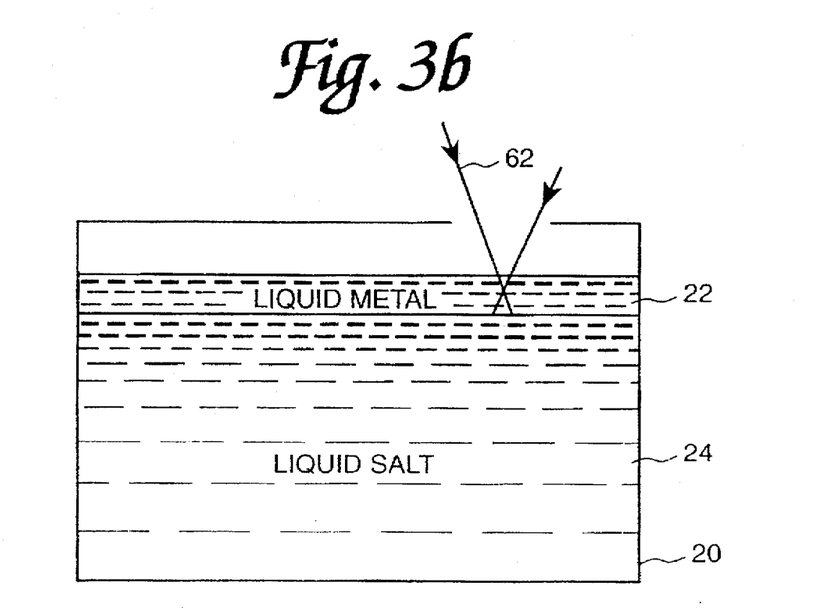
Figure 3C:
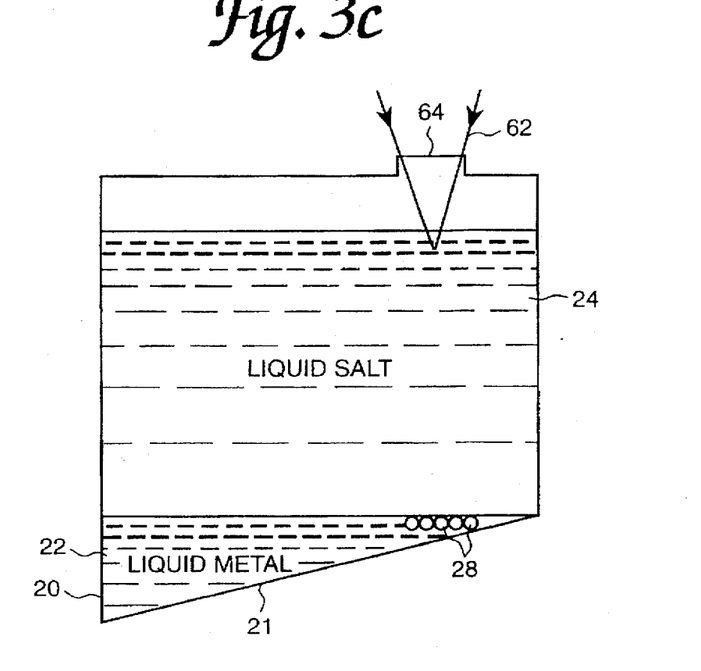
Figure 3D:
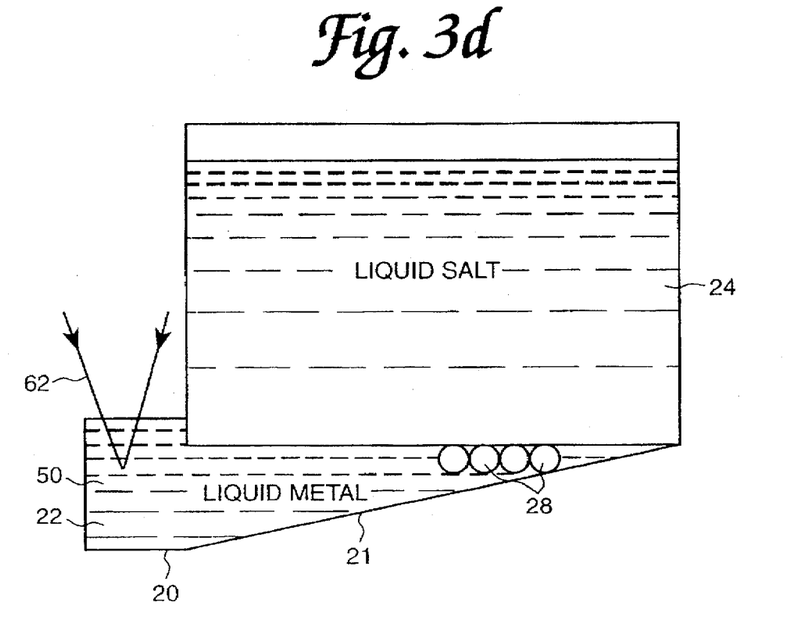

FIGS. 3a–d show the novel heat storage and transfer system incorporated in to a solar system. FIG. 3a shows a transparent heat storage system using upper liquid metal layer 22 separated from the lower liquid salt by a baffle 60 to allow solar energy 62 to directly strike and be absorbed by the exposed liquid salt. In FIG. 3b, the upper liquid metal is transparent. FIG. 3c shows absorption of solar energy 62 by now upper layer 24 of liquid salt. The vessel 20 has a sloping bottom 21 and heat transfer pipes 28 are immersed in the liquid metal layer 22. Solar energy enters vessel 20 through transparent section 64. In FIG. 3d, the vessel 20 is provided with lateral extension 50 having a transparent top to allow penetration of solar energy 62 and absorption by liquid metal lower layer 22.

Figure 4:
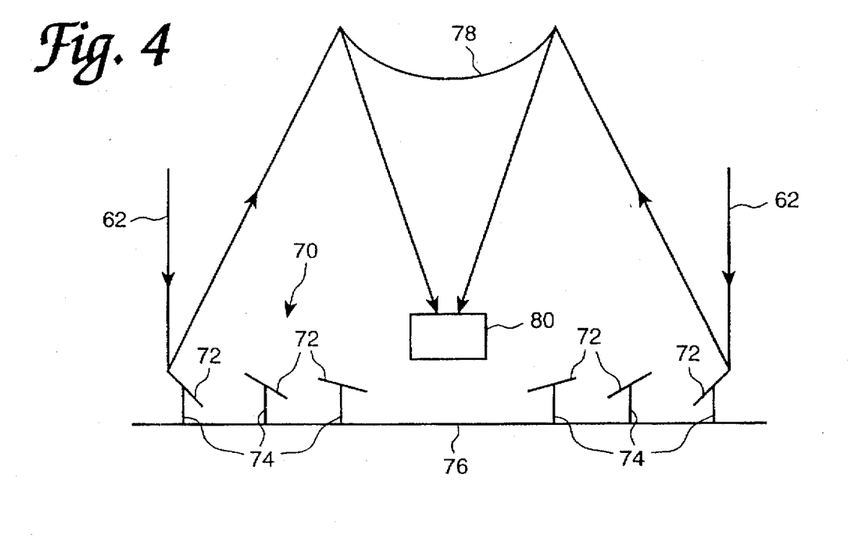
FIG. 4 shows a solar system where the solar light is collected by a heliostat field and a mirror is placed on the tower and reflects the light to the storage system.

FIG. 4 shows a solar energy system where solar light 62 is collected by a heliostat filed 70 consisting of mirrors 72 on mountings 74 supported on the ground or a suitable platform 76. Mirrors 72 are appropriately directed toward a convex mirror 78 mounted on a tower (not shown). Mirror 78 focuses the reflected solar energy onto the novel heat storage device 80 of the invention (in a form as previously described).

Figures 5A, 5B:
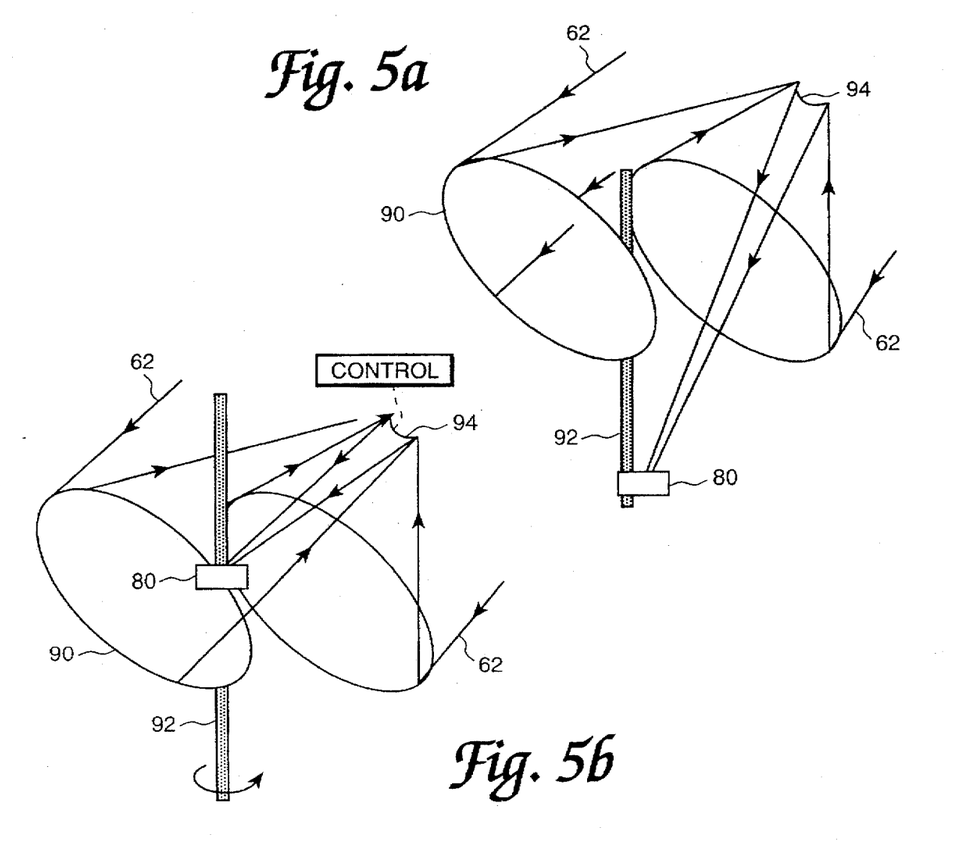
FIG. 5b shows a solar dish with the collecting system placed on the ground with light reaching the storage system from the dish is facing the sun continuously via a secondary mirror which moves responsive to a separate control that continually positions the secondary mirror so that the light is reflected to the storage system.

FIG. 5a shows a solar dish 90 reflecting solar energy 62 to storage device 80. Dish 90 rotates around axis 92 and in all positions (two positions shown) reflects solar energy to secondary mirror 94 which focuses on device 80. In FIG. 5b, solar dish 90 rotates about axis 92. Device 80 is positioned on the ground. Secondary mirror 94 is driving by a suitable motor and linkage to constantly reflect light from mirror 90 to device 80. A sensor senses the reflection of solar energy from mirror 90 and a controller in control 96 drives the motor linkage 98 and secondary mirror 94 to direct the solar energy reflected from dish 90 to device 80.

Although the invention has been shown and described with reference to preferred embodiments, changes and modifications will be apparent to those skilled in the art which do not depart from the teachings of the present invention. Such changes and modifications are deemed to fall within the purview of the invention as claimed.

What is claimed is:

1. A two layer heat storage system comprising two layers in contact with each other where one layer is a heat storage layer and the other layer is an intermediate phase layer used for extracting heat, wherein the heat storage layer is a phase change layer, in which a solid form of the phase change layer has a density lower than a liquid form of the heat phase change layer, and the intermediate phase layer is a liquid metal layer having a density higher than both phases of the phase change layer.

2. A system as in claim 1 where the heat storage layer is a molten salt.

3. A system in claim 1 where the heat transfer to an external system is achieved by circulation of a heat transfer liquid.

4. A system as in claim 1 where the heat transfer to an external system is achieved by a fluid circulating in tubes which are immersed in a heat transfer liquid.

5. A system as in claim 4 where the gravitational hydraulic pressure in the system is used to compensate the pressure used for the fluid in the external system.

6. A system as in claim 5 where the heat transfer is achieved by direct contact of working gas with the heat transfer liquid layer.

7. A system as in claim 1 where the heat transfer to an external system is achieved by an external heat pipe immersed in a heat transfer liquid.

8. A system as in claim 1 where the intermediate phase is vaporizable liquid metal and the heat exchange to an external system is achieved by condensing the vapor of the liquid metal heat extracting layer, and returning the condensed metal to the heat extracting layer by gravitation or by pumping.

9. A system as in claim 1 where the heat storage system is a component in a solar system.

10. A system as in claim 9 where the solar system includes a concentrating system based on one axis tracking of the sun.

11. A system as in claim 9 where the solar system is a concentrating system based on two axis tracking of the sun.

12. A system as in claim 11 where the tracking system is a single or multiple mirror systems.

13. A system as in claim 12 where the storage system is placed close the focal point of the tracking mirror.

14. A system as in claim 12 where the solar light is reflected to the storage system which is placed at the axis of tracking and a fixed mirror is placed close to the focal point of the tracking mirror and reflects solar light to the storage system.

15. A system as in claim 12 where the storage system is placed in a fixed point and the solar light is pointing at the target storage system by a separate control of the orientation of a secondary mirror.

16. A system as in claim 12 where the solar system is a heliostat field reflecting solar light to an elevated target where it is directed to the storage system.

17. A system as in claim 16 where the solar light is reflected downwards to the storage system by a mirror placed on the solar tower.

18. A system as in claim 1, wherein the liquid metal layer is separated from the heat storage layer by a baffle, whereby that solar energy is directly received and absorbed by the heat storage layer.

19. A system as in claim 1, wherein the liquid metal layer has a transparent top to allow penetration of solar energy into the liquid metal layer.

20. A system as in claim 1, wherein the liquid metal layer is placed below the heat storage layer.

21. A system as in claim 20, wherein solar energy is received directly by the heat storage layer which is an upper layer.

22. A system as in claim 20 where the vessel is provided with a lateral extension having a transparent top, whereby solar energy is received and absorbed by the liquid metal layer.

23. A two layer heat storage system comprising two layers in contact each other where one layer is a heat storage layer and the other layer is an intermediate phase layer used for extracting heat, wherein the liquid metal layer is separated from the heat storage layer by a baffle, whereby solar energy is directly received and absorbed by the heat storage layer.

24. A system as in claim 23, wherein the heat storage system is a component in a solar system.

25. A system as in claims 24, wherein the solar system includes a concentrating system based on one axis tracking of the sun.

26. A system as in claim 24, wherein the solar system is a concentrating system based on two axis tracking of the sun.

27. A system as in claim 26, wherein the tracking system is a single or multiple dish systems.

28. A system as in claim 27, wherein the storage system is placed close to the focal point of the tracking mirror.

29. A system as in claim 28, wherein the solar light is reflected downwards to the storage system by a mirror placed on the solar tower.

30. A system as in claim 27, wherein the solar light is reflected to the storage system which is placed at the axis of tracking and fixed mirror is placed close to the focal point of the tracking mirror and reflects solar light to the storage system.

31. A system as in claim 27, wherein the storage system is placed in a fixed point and the solar light is pointing at the target storage system by a separated control of the orientation of a secondary mirror.

32. A system as in claim 26, wherein the solar system is a heliostate field reflecting solar light to an elevated target where it is directed to the storage system.

33. A two layer heat storage system comprising two layers in contact each other where one layer is a heat storage layer and the other layer is an intermediate phase layer used for extracting heat, wherein the liquid metal layer has a transparent top to allow penetration of solar energy into the liquid metal layer.

34. A system as in claim 33, wherein the heat storage system is a component in a solar system.

35. A system as in claims 34, wherein the solar system includes a concentrating system based on one axis tracking of the sun.

36. A system as in claim 34, wherein the solar system is a concentrating system based on two axis tracking of the sun.

37. A system as in claim 36, wherein the solar system is a heliostate field reflecting solar light to an elevated target where it is directed to the storage system.

38. A system as in claim 36, wherein the tracking system is a single or multiple dish systems.

39. A system as in claim 38, wherein the storage system is placed close to the focal point of the tracking mirror.

40. A system as in claim 38, wherein the solar light is reflected to the storage system which is placed at the axis of tracking and fixed mirror is placed close to the focal point of the tracking mirror and reflects solar light to the storage system.

41. A system as in claim 38, wherein the storage system is placed in a fixed point and the solar light is pointing at the target storage system by a separated control of the orientation of a secondary mirror.

42. A system as in claim 39, wherein the solar light is reflected downwards to the storage system by a mirror placed on the solar tower.

43. A two layer heat storage system comprising two layers in contact each other where one layer is a heat storage layer and the other layer is an intermediate phase layer used for extracting heat, wherein the intermediate phase layer is placed below the heat storage layer.

44. A system as in claim 43, wherein solar energy is received directly by the heat storage layer which is an upper layer.

45. A system as in claim 43, wherein the vessel is provided with a lateral extension having a transparent top, whereby solar energy is received and absorbed by the liquid metal layer.

46. A system as in claim 43, wherein the heat storage system is a component in a solar system.

47. A system as in claims 46, wherein the solar system includes a concentrating system based on one axis tracking of the sun.

48. A system as in claim 46, wherein the solar system is a concentrating system based on two axis tracking of the sun.

49. A system as in claim 48, wherein the tracking system is a single or multiple dish systems.

50. A system as in claim 49, wherein the storage system is placed close to the focal point of the tracking mirror.

51. A system as in claim 49, wherein the solar light is reflected to the storage system which is placed at the axis of tracking and fixed mirror is placed close to the focal point of the tracking mirror and reflects solar light to the storage system.

52. A system as in claim 49, wherein the storage system is placed in a fixed point and the solar light is pointing at the target storage system by a separated control of the orientation of a secondary mirror.

53. A system as in claim 48, wherein the solar system is a heliostate field reflecting solar light to an elevated target where it is directed to the storage system.

54. A system as in claim 50, wherein the solar light is reflected downwards to the storage system by a mirror placed on the solar tower.

* * * * *